United States Patent
Jang et al.

(10) Patent No.: US 11,843,099 B2
(45) Date of Patent: Dec. 12, 2023

(54) METHOD AND SYSTEM FOR EXTRACTING ELECTROLYTE IN LITHIUM SECONDARY BATTERY BY FREEZING AND CUTTING THE SECONDARY BATTERY

(71) Applicant: LG Chem, Ltd., Seoul (KR)

(72) Inventors: Rin Jang, Daejeon (KR); Jeong Ae Ahn, Daejeon (KR); Junghyun Song, Daejeon (KR); Byoung Hyoun Kim, Daejeon (KR)

(73) Assignee: LG Energy Solution, Ltd.

( * ) Notice: Subject to any disclaimer, the term of this patent is extended or adjusted under 35 U.S.C. 154(b) by 342 days.

(21) Appl. No.: 17/226,811

(22) Filed: Apr. 9, 2021

(65) Prior Publication Data

US 2021/0328282 A1 Oct. 21, 2021

(30) Foreign Application Priority Data

Apr. 20, 2020 (KR) .................. 10-2020-0047202
Dec. 23, 2020 (KR) .................. 10-2020-0182332

(51) Int. Cl.
*H01M 10/54* (2006.01)
*B01D 11/02* (2006.01)
(Continued)

(52) U.S. Cl.
CPC ......... *H01M 10/54* (2013.01); *B01D 11/0288* (2013.01); *G01N 1/04* (2013.01); *G01N 1/42* (2013.01); *G01N 24/08* (2013.01)

(58) Field of Classification Search
CPC .. B01D 11/0288; B01D 11/0492; G01N 1/04; G01N 1/286; G01N 1/42; G01N 2001/2873; G01N 24/08; G01N 1/4055; G01N 2001/4061; H01M 10/54; H01M 10/052; H01M 10/0568; H01M 10/0569; H01M 10/4285; H01M 50/691; B26D 1/30; B26D 7/2628; Y02E 60/10; Y02W 30/84

See application file for complete search history.

(56) References Cited

U.S. PATENT DOCUMENTS 6,329,096 B2 * 12/2001 Kawakami ............ H01M 10/54
  429/49
10,553,903 B2   2/2020 Oh et al.
2013/0302223 A1  11/2013 Sloop

FOREIGN PATENT DOCUMENTS

CN  103825065 A    5/2014
CN  108933307 A  * 12/2018  ........ H01M 10/0525
(Continued)

*Primary Examiner* — Jay Patidar
(74) *Attorney, Agent, or Firm* — Lerner David LLP

(57) ABSTRACT

A method for extracting electrolyte solution in lithium secondary battery includes (S1) freezing a secondary battery by impregnating in liquid nitrogen and then cutting it without disassembling; (S2) immersing the frozen cut secondary battery in an extraction solvent to extract an electrolyte solution contained in the battery; and (S3) calculating the total amount of the electrolyte solution with respect to the total size of the battery from the content of the extracted electrolyte solution, and then determining a ratio of total amount of the electrolyte solution to the content of the electrolyte solution used in manufacturing the secondary battery to obtain extraction efficiency. A system for extracting an electrolyte solution in a secondary battery is also provided.

12 Claims, 1 Drawing Sheet

(51) Int. Cl.
 *G01N 1/42* (2006.01)
 *G01N 1/04* (2006.01)
 *G01N 24/08* (2006.01)

(56) References Cited

FOREIGN PATENT DOCUMENTS

| | | | |
|---|---|---|---|
| CN | 109361032 A | | 2/2019 |
| CN | 107248598 B | * | 8/2019 |
| CN | 110620276 A | | 12/2019 |
| CN | 115178789 A | * | 10/2022 |
| KR | 20000019850 A | | 4/2000 |
| KR | 20030070468 A | | 8/2003 |
| KR | 20040071776 A | | 8/2004 |
| KR | 101372010 B1 | | 3/2014 |
| KR | 20180065958 A | | 6/2018 |

* cited by examiner

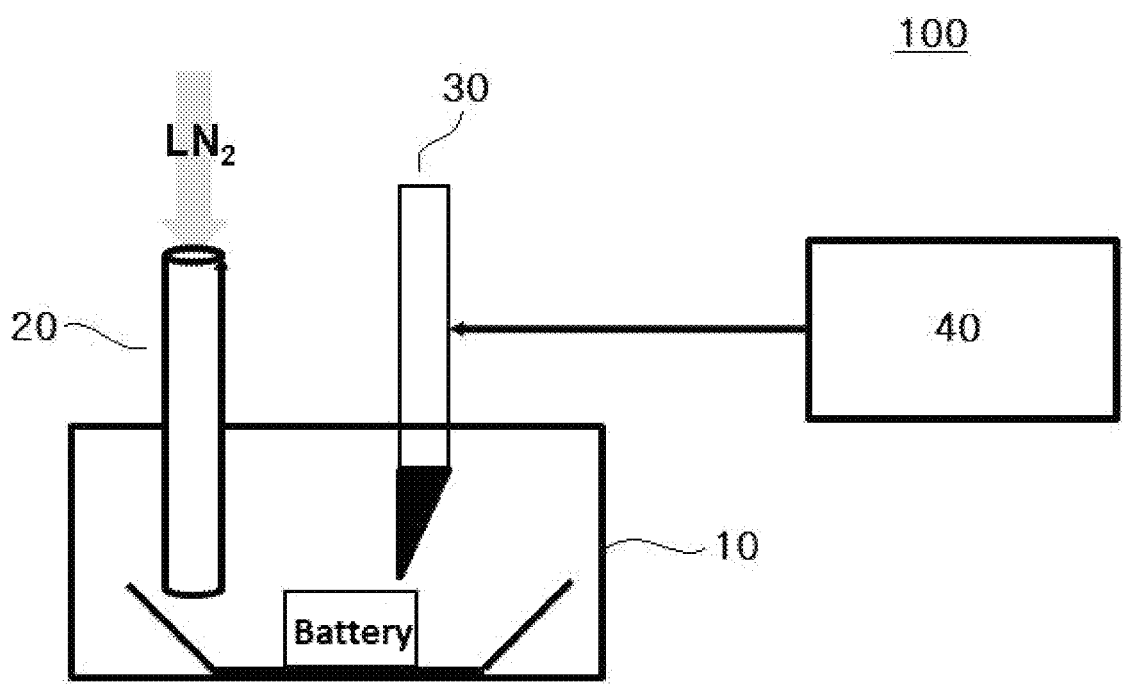

METHOD AND SYSTEM FOR EXTRACTING ELECTROLYTE IN LITHIUM SECONDARY BATTERY BY FREEZING AND CUTTING THE SECONDARY BATTERY

CROSS-REFERENCE TO RELATED APPLICATIONS

This application claims the benefit of priority from Korean Patent Application No. 10-2020-0047202 filed on Apr. 20, 2020 and Korean Patent Application No. 10-2020-0182332 filed on Dec. 23, 2020, the entire disclosure of which is incorporated by reference herein.

TECHNICAL FIELD

The present invention relates to a method and system for extracting electrolyte solution in a lithium secondary battery.

BACKGROUND ART

As technology development and demand for mobile devices and electric vehicles increase, the demand for secondary batteries is rapidly increasing that are rechargeable and capable of miniaturizing and large-capacity.

The secondary battery generally has a structure in which an electrode assembly consisting of a positive electrode and a negative electrode including electrode active materials capable of intercalating/releasing lithium ions and a separator for separating the two electrodes is impregnated in an electrolyte solution which is a transfer medium for lithium ions. In addition, lithium ions move between the negative electrode and the positive electrode via the electrolyte solution to charge and discharge the battery.

In the process of the charging/discharging and storage of such a secondary battery, the electrolyte solution is decomposed by a reaction inside the battery, so that gas, by-products on electrode surfaces, reaction by-products of an electrolyte solution, etc. can be generated. From this, the amount of the electrolyte solution initially injected may be different from the total amount of the electrolyte solution after the use of the battery. Since the electrolyte solution is closely related to the charging and discharging of the battery, the difference in content will continue to affect battery performance.

Therefore, it is important to analyze the content of the electrolyte solution contained in the battery in order to maintain a constant battery performance according to the operation of the secondary battery. Various extraction methods are used for this purpose. In the conventional extraction of an electrolyte solution in a battery, there are mainly used a method of extracting an electrolyte solution by drilling a fine hole in a battery and introducing a solvent thereinto to dissolve the electrolyte solution, and a method of extracting an electrolyte solution contained in electrodes by dissembling a battery and placing each electrode into a solvent. In the former case, it is difficult to extract up to the electrolyte solution inside the electrode, and in the latter case, there is a limitation in that all electrolyte components cannot be precisely extracted due to the loss of volatile components in the electrolyte solution in the process of disassembling the battery.

DETAILED DESCRIPTION OF THE INVENTION

Technical Problem

The present invention is to overcome the limitations of the conventional extraction method of an electrolyte solution in a secondary battery, and to provide a method and system capable of extracting an electrolyte solution inside a battery with high efficiency without disassembling the battery in order to minimize the loss of volatile components during extraction of the electrolyte solution.

Solution to Problem

The present invention provides a method for extracting an electrolyte solution in a secondary battery, comprising the steps of:

(S1) freezing a secondary battery by impregnating in liquid nitrogen and then cutting it without disassembling;

(S2) immersing the frozen cut secondary battery in an extraction solvent to extract an electrolyte solution contained in the battery; and (S3) calculating the total amount of the electrolyte solution with respect to the total size of the battery from the content of the extracted electrolyte solution, and then determining a ratio of total amount of the electrolyte solution to the content of the electrolyte solution used in manufacturing the secondary battery to obtain extraction efficiency.

In addition, the present invention provides an extraction system for extracting an electrolyte solution in a secondary battery, which is for applying the above method, the extraction system comprising:

(i) a chamber for accommodating and fixing a secondary battery;

(ii) an injection unit inserted in the chamber to supply liquid nitrogen to the chamber; and (iii) a cutter for cutting the frozen battery, which is inserted in the chamber to be movable up and down while being spaced apart from the injection unit for liquid nitrogen.

Effect of the Invention

According to the present invention, the secondary battery is subject to freezing with liquid nitrogen to secure the battery from the risk of explosion due to micro-short-circuit and to prevent electrolyte solution components from volatilization. By cutting the frozen battery without disassembling as it is, and extracting the electrolyte solution therefrom, the extraction solvent can directly contact the inside of the battery, especially up to the electrode and separator impregnated with the electrolyte solution, so that the electrolyte solution can be extracted with high efficiency without loss of volatile components.

BRIEF DESCRIPTION OF DRAWINGS

FIG. 1 schematically shows a system to be used for extraction of an electrolyte solution in a secondary battery according to an embodiment of the present invention.

BEST MODE FOR CARRYING OUT THE INVENTION

Hereinafter, the present invention will be described in detail with reference to the drawings. Terms and words used in the specification and claims are not to be construed as being limited to their usual or dictionary meanings and should be interpreted as meanings and concepts consistent with the technical idea of the present invention based on the principle that the inventor can appropriately define the concept of the term in order to describe his or her own invention in the best way.

In addition, the embodiments described in the present disclosure and the configurations shown in the drawings are only the most preferred embodiment of the present invention, and do not represent all the technical spirit of the present invention. Therefore, it should be understood that there may be equivalents and modifications that may be substituted for them at the time of the present invention.

An embodiment of the present invention relates to a method for extracting an electrolyte solution in a secondary battery, the method comprising the steps of: (S1) freezing and cutting a secondary battery, (S2) extracting an electrolyte solution from the cut secondary battery, and (S3) calculating extraction efficiency of the electrolyte solution.

FIG. 1 schematically shows a system to be used for extraction of an electrolyte solution in a secondary battery according to an embodiment of the present invention, and the electrolyte solution extraction system 100 of FIG. 1 includes a chamber 10 for accommodating and fixing a secondary battery; an injection unit for liquid nitrogen 20; and a cutter 30 and may further include a remote control unit 40 as necessary.

Hereinafter, the method for extracting an electrolyte solution of the present invention will be described according to each step with reference to FIG. 1.

In the step (S1), the secondary battery is frozen as it is without disassembling and cut without disassembling.

The secondary battery may be manufactured by a method known in the art, for example by impregnating an electrode assembly consisting of a positive electrode and a negative electrode including electrode active materials capable of intercalating/releasing lithium ions and a separator for separating the two electrodes with an electrolyte solution which is a transfer medium for lithium ions.

The electrolyte may be a non-aqueous electrolyte solution containing a lithium salt and an organic solvent for dissolving the lithium salt.

The lithium salt may be one commonly used in an electrolyte solution for a secondary battery. For example, any one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$ may be used as the anion of the lithium salt.

Examples of the organic solvent contained in the electrolyte solution include propylene carbonate, ethylene carbonate, diethyl carbonate, dimethyl carbonate, ethyl methyl carbonate, methyl propyl carbonate, dipropyl carbonate, dimethyl sulfoxide, acetonitrile, dimethoxyethane, diethoxyethane, vinylene carbonate, sulfolane, gamma-butyrolactone, propylene sulfite, tetrahydrofuran, or mixtures thereof.

In addition, the electrolyte solution may further comprise an additive such as an overcharge protection agent commonly included in the electrolyte solution.

This electrolyte solution is impregnated into the electrode of the secondary battery to serve to move lithium ions between the negative electrode and the positive electrode during charging and discharging.

In the present invention, in order to restrict or stop the movement of lithium ions in the secondary battery having the configuration as described above, the secondary battery is introduced into the chamber 10 of the electrolyte solution extraction system 100 as shown in FIG. 1 and liquid nitrogen is supplied into the chamber through the injection unit 20 inserted in the chamber to freeze the battery as it is without disassembling.

The liquid nitrogen, which is a liquefied nitrogen, has a boiling point of −196° C. under atmospheric pressure, so it exists as a colorless and odorless liquid and is widely used as a coolant using cryogenic temperature.

Nitrogen in a liquid state comes into contact with the secondary battery and is supplied enough to stably maintain the frozen state of all electrolyte solutions inside the battery.

In one embodiment of the present invention, the impregnation of the battery in the supplied liquid nitrogen may be performed for 1 minute to 2 hours, such as about 30 minutes or 1 hour for complete freezing of the battery. At this time, whether the battery is completely frozen can be determined by measuring the open circuit voltage (OCV) of the battery. For example, when the OCV value falls below 0.1V, it can be determined that the movement of lithium ions in the battery is restricted.

In the case of freezing the secondary battery as in the present invention, the movement of lithium ions in the battery disappears, so that there is no voltage difference occurring in the battery due to charging and discharging. In addition, a stable state can be formed in which the electrolyte solution components present inside the battery are not volatilized. Accordingly, problems caused by the loss of volatile components in the electrolyte solution in the conventional extraction method for electrolyte solution can be overcome, and even if an external impact such as cutting is applied, micro internal short circuits of the electrode can be suppressed, thereby preventing the risk of explosion.

The frozen battery is cut as it is without disassembling by using a cutter 30 inserted in the chamber 10 to be spaced apart from the injection unit for liquid nitrogen 20. At this time, it is better to fix the battery so that it does not move before cutting.

The cutter 30 is in the form of a straw cutter having a blade and operated to be movable up and down toward the battery. The cutter is commercially available (e.g., 3SR200 from EHOMA).

The cutter 30 can be operated manually by pressing the blade directly from the top to the bottom toward the battery or can be operated remotely by additionally disposing a remote control unit 40 outside the chamber. In the latter case, by operating a switch of the remote control unit 40, cutting can be performed at a longer distance than in the case of manual operation, thereby minimizing the risk of explosion that may occur in the charged battery. Although a completely frozen battery is less likely to explode, it is more advantageous to cut it from a distance in consideration of safety.

In one embodiment of the present invention, the cutter can cut the battery while the blade forms an angle of 40 degrees to 90 degrees with respect to the surface of the battery. When maintaining these angles, the extraction solvent can directly contact up to the electrode and the separator impregnated with the electrolyte solution and thus the electrolyte solution can be extracted with high efficiency without loss of volatile components.

In particular, in order to minimize the internal short circuit of the battery, it is preferable to cut at an angle of 90 degrees to the direction in which the positive electrode/separator/negative electrode constituting the battery are sequentially stacked. In such a case, an internal short circuit can be suppressed by preventing direct contact between the positive electrode and the negative electrode during extracting the electrolyte solution.

In addition, the cutting of the frozen battery may be performed at least two or more times so that at least two or more cut surfaces are created to allow the extraction solution to enter thereinto. For example, the frozen battery can be cut to a size of ⅓ to ⅙.

In the step (S2), the frozen cut secondary battery is introduced into the extraction solvent to extract the electrolyte solution contained in the battery. At this time, it is preferable that the frozen cut battery is maintained in a frozen state when immersed in the extraction solvent in order to suppress the loss of volatile components.

The extraction solvent may be acetone, dimethyl carbonate (DMC), chloroform, methanol, ethanol, dimethylformamide (DMF), methyl propionate (MP), ethyl propionate (EP), or a mixture thereof. In addition, solvents obtained by substituting each of the solvents with deuterium can be used as a solvent for diluting the extracted electrolyte solution before NMR analysis.

In addition, the extraction solvent may be a fluorine-containing internal standard having a peak that does not overlap with a peak of the electrolyte solution for the following MMR analysis, for example, fluorobenzene, 1,2-difluorobenzene, 1,3-difluorobenzene, 1,4-difluorobenzene, 1,2,4-trifluorobenzene, 1,3,5-trifluorobenzene, trifluorotoluene, 1,2-bistrifluoromethylbenzene, 1,3-bistrifluorobenzene, 1,4-bistrifluorobenzene, 1,3,5-tristrifluorobenzene, and the like.

In an embodiment of the present invention, the extraction may be performed at 20 to 40° C., for example, at room temperature (25±5° C.), for 5 minutes to 3 days, such as for 1 day.

If necessary, after introducing the cut secondary battery in the extraction solvent, shaking or sonication may be performed for at least 1 day in order to improve extraction efficiency.

In the step (S3), the total amount of the electrolyte solution with respect to the total size of the battery is calculated from the content of the extracted electrolyte solution and a ratio of total amount of the electrolyte solution to the content of the electrolyte solution used in manufacturing the secondary battery is determined to obtain extraction efficiency.

In addition, by using the calculated extraction efficiency, it is possible to determine an actual content, that is, an absolute content, of the electrolyte solution remaining after battery operation relative to the content of the electrolyte solution introduced during manufacturing the secondary battery.

Furthermore, identification and measurement of the content of each component included in the extracted electrolyte solution may be performed using nuclear magnetic resonance (NMR).

As described above, the secondary battery is subject to freezing with liquid nitrogen to secure the battery from the risk of explosion due to micro-short-circuit and to prevent electrolyte solution components from volatilization. By cutting the frozen battery without disassembling as it is, and extracting the electrolyte solution therefrom, the extraction solvent can directly contact the inside of the battery, especially up to the electrode and separator impregnated with the electrolyte solution, so that the electrolyte solution can be extracted with high efficiency without loss of volatile components.

In addition, the present invention provides an extraction system for extracting electrolyte solution used in the extraction method as described above and the system may comprise the following configuration units, as described above:

(i) a chamber for accommodating and fixing a secondary battery;

(ii) an injection unit inserted in the chamber to supply liquid nitrogen to the chamber; and (iii) a cutter for cutting the frozen battery, which is inserted in the chamber so as to be spaced apart from the injection unit for liquid nitrogen.

In addition, the extraction system may further comprise a remote control unit for adjusting the position and angle of the cutter with respect to the surface of the frozen battery.

Hereinafter, examples will be described in detail to aid understanding of the present invention. However, the examples according to the present invention may be variously modified, and the scope of the present invention should not be construed as being limited to the following examples. The embodiments of the present invention are provided to more completely explain the present invention to those of ordinary skill in the art.

Example 1

A secondary battery manufactured by introducing 2.2991 g of an electrolyte solution having a composition as shown in Table 1 below was placed in the chamber 10 of the extraction system 100 as shown in FIG. 1, and liquid nitrogen was stably supplied into the chamber 10 through the injection unit for liquid nitrogen 20 for about 1 hour to impregnate the secondary battery. When the open circuit voltage (OCV) of the impregnated battery dropped below 0.1 V, it was determined that it was completely frozen, and the frozen battery was cut to a size of ¼ using the cutter 30 inserted in the chamber 10 to be movable up and down.

The frozen cut battery was placed in 4 containers made of PP or HDPE containing a mixture having 1,2-bistrifluoromethylbenzene (internal standard solution) added to acetone as an extraction solvent at room temperature, and stirred for one day to extract the electrolyte solution in the cut secondary battery. Half of the extracted electrolyte solution was diluted in acetone-D6 and then analyzed by NMR. The content of the electrolyte component with respect to the weight of the internal standard solution was calculated. The calculated content of the electrolyte component was compared with the actual amount used and the results are shown in Table 1 below.

TABLE 1

| Electrolyte component in sample | Actual amount used for each component (mg) | Content of each component of cut battery according to NMR analysis (mg) | | | |
|---|---|---|---|---|---|
| | | Cut battery 1 | Cut battery 2 | Cut battery 3 | Cut battery 4 |
| Solvent 1(EC) | 741.1 | 261.9 | 125.9 | 223.5 | 155.0 |
| Solvent 2(EMC) | 1335.3 | 450.8 | 222.2 | 391.3 | 260.9 |
| Lithium salt (LiPF$_6$) | 222.7 | 75.4 | 37.2 | 63.9 | 43.1 |
| Total | 2299.1 | 2311.1 | | | |

The sum of the contents of each of the extracted electrolyte components was found and the total amount of the electrolyte solution with respect to the total size of the battery was calculated. The extraction efficiency was calculated as follows by obtaining a ratio of the total amount of the electrolyte solution to the content of the electrolyte solution used in manufacturing the secondary battery.

Extraction efficiency of electrolyte solution (recovery rate)=(Total amount of electrolyte solution)/(Content of the used electrolyte solution)×100=2311.1 mg/2299.1 mg×100=100.5%

From the above results, it is found that there is no loss of volatile components and the electrolyte solution inside the battery is extracted with high efficiency when the secondary battery is cut with freezing with liquid nitrogen and the electrolyte is extracted by immersing each of 4 cut pieces of the battery in acetone.

Example 2

A secondary battery manufactured by introducing 2.4120 g of an electrolyte solution having a composition as shown in Table 2 below was placed in the chamber 10 of the extraction system 100 as shown in FIG. 1, and liquid nitrogen was stably supplied into the chamber 10 through the injection unit for liquid nitrogen 20 for about 1 hour to impregnate the secondary battery. When the open circuit voltage (OCV) of the impregnated battery dropped below 0.1 V, it was determined that it was completely frozen, and the frozen battery was cut to a size of ⅓ using the cutter 30 inserted in the chamber 10 to be movable up and down.

The frozen cut battery was placed in 3 containers made of PP containing a mixture having 1,2-bistrifluoromethylbenzene (internal standard solution) added to acetone as an extraction solvent at room temperature. The electrolyte was extracted and the content of the extracted electrolyte component was calculated in the same manner as in Example 1. The results are shown in Table 2 below.

TABLE 2

| Electrolyte component in sample | Actual amount used for each component (mg) | Content of each component of cut battery according to NMR analysis (mg) | | |
| --- | --- | --- | --- | --- |
| | | Cut battery 1 | Cut battery 2 | Cut battery 3 |
| Solvent 1(EC) | 777.5 | 217.0 | 331.0 | 200.0 |
| Solvent 2(EMC) | 1400.9 | 380.1 | 548.6 | 335.2 |
| Lithium salt (LiPF$_6$) | 233.6 | 59.5 | 94.2 | 55.4 |
| Total | 2412.0 | | 2221.0 | |

Extraction efficiency of electrolyte solution (recovery rate)=(Total amount of electrolyte solution)/(Content of the used electrolyte solution)×100=2221.0 mg/2412.0 mg×100=92.1%

From the results of Table 2 above, it is found that when the frozen battery is cut to a size of ⅓, the cutting surface into which the extraction solvent of acetone can enter is reduced, so that the extraction efficiency is slightly lower than that of cutting to a size of ¼, but it still shows a high extraction efficiency of 90% or more. That is, when the electrolyte is extracted after the secondary battery is frozen with liquid nitrogen, there is no loss of volatile components for various cutting sizes, so that the electrolyte solution inside the battery can be extracted with high efficiency.

Example 3

A secondary battery manufactured by introducing 2.3118 g of an electrolyte solution having a composition as shown in Table 3 below was placed in the chamber 10 of the extraction system 100 as shown in FIG. 1, and liquid nitrogen was stably supplied into the chamber 10 through the injection unit for liquid nitrogen 20 for about 1 hour to impregnate the secondary battery. When the open circuit voltage (OCV) of the impregnated battery dropped below 0.1 V, it was determined that it was completely frozen, and the frozen battery was cut to a size of ¼ using the cutter 30 inserted in the chamber 10 to be movable up and down.

All cut pieces of the frozen battery were placed in one container made of PP containing a mixture having 1,2-bistrifluoromethylbenzene (internal standard solution) added to acetone as an extraction solvent at room temperature. The electrolyte was extracted and the content of the extracted electrolyte component was calculated in the same manner as in Example 1. The results are shown in Table 3 below.

TABLE 3

| Electrolyte component in sample | Actual amount used for each component (mg) | Content of each component of cut battery according to NMR analysis (mg) |
| --- | --- | --- |
| Solvent 1 (EC) | 745.2 | 750.3 |
| Solvent 2(EMC) | 1342.7 | 1291.1 |
| Lithium salt (LiPF$_6$) | 223.0 | 220.4 |
| Total | 2311.8 | 2261.8 |

Extraction efficiency of electrolyte solution (recovery rate)=(Total amount of electrolyte solution)/(Content of the used electrolyte solution)×100=2261.8 mg/2311.8 mg×100=97.8%

From the results of Table 3, it is found that even when the frozen battery is cut to a size of ¼ and the electrolyte is extracted by immersing all cut pieces of the battery in an extraction solvent of dimethyl carbonate at once, it can show a high extraction efficiency of 90% or more.

Comparative Example

A hole was drilled in a portion where a short circuit did not occur in the electrode portion of the same battery used as in the above Example. After introducing a mixture having 1,2-bistrifluoromethylbenzene (internal standard solution) added to acetone-D6 as an extraction solvent, into the hole, the hole was closed with tape, and the battery was fixed on a shaker and shaken for 3 days to allow the solvent to move inside the battery. Another hole was drilled in the battery again to withdraw the solution from which the electrolyte was extracted, and the solution was subjected to NMR analysis. The content of the electrolyte component relative to the weight of the internal standard solution was calculated. The calculated content of the electrolyte component was compared with the actual amount used, and the results are shown in Table 4 below.

TABLE 4

| Electrolyte component in sample | Actual amount used for each component (mg) | Content of each component according to NMR analysis (mg) |
| --- | --- | --- |
| Solvent 1(EC) | 741.1 | 20.6 |
| Solvent 2(EMC) | 1335.3 | 40.5 |
| Lithium salt (LiPF$_6$) | 222.7 | 4.3 |
| Total | 2299.1 | 65.4 |

From the results in Table 2, it is found that when the extraction efficiency was calculated by obtaining a ratio of the total amount of the electrolyte extracted to the content of the electrolyte solution used in manufacturing the secondary battery, the extraction efficiency was only about 2.8% (65.4 mg/2299.1 mg×100), indicating that the recovery rate of the electrolyte solution was very small.

The invention claimed is:

1. A method for extracting an electrolyte solution in a secondary battery comprising:
   (S1) freezing a secondary battery by impregnating in liquid nitrogen and then cutting the secondary battery without disassembling;
   (S2) immersing the frozen cut secondary battery in an extraction solvent to extract an electrolyte solution contained in the secondary battery; and
   (S3) calculating a total amount of the electrolyte solution with respect to a total size of the secondary battery from a content of the extracted electrolyte solution, and then determining a ratio of the total amount of the electrolyte solution to a content of the electrolyte solution used in manufacturing the secondary battery to obtain extraction efficiency.

2. The method according to claim 1, wherein the frozen cut secondary battery in the step (S2) is immersed in the extraction solvent while maintaining a frozen state.

3. The method according to claim 1, further comprising analyzing the extracted electrolyte solution by NMR (nuclear magnetic resonance) to determine a content ratio of each component contained in the electrolyte solution.

4. The method according to claim 1, wherein the cutting of the frozen battery in the step (S1) is performed by using a cutter in a state in which an entire secondary battery is completely frozen by impregnating in liquid nitrogen.

5. The method according to claim 4, wherein the cutter is in a form of a straw cutter having a blade and configured to be movable up and down the secondary battery.

6. The method according to claim 4, wherein the cutter is configured to cut the secondary battery while the blade forms an angle of 40 degrees to 90 degrees with respect to a surface of the frozen secondary battery.

7. The method according to claim 1, wherein the frozen secondary battery in the step (S1) is cut to a size of ⅓ to ⅙.

8. The method according to claim 1, wherein the impregnation of the secondary battery in the liquid nitrogen is performed for 1 minute to 2 hours.

9. The method according to claim 1, wherein the extraction solvent is acetone, dimethyl carbonate (DMC), chloroform, methanol, ethanol, dimethylformamide (DMF), methyl propionate (MP), ethyl propionate (EP), or a mixture thereof.

10. The method according to claim 1, wherein the electrolyte solution contains an organic solvent and a lithium salt.

11. A system for extracting an electrolyte solution in a secondary battery, comprising:
    (i) a chamber for accommodating the secondary battery and securing the secondary battery in a set position;
    (ii) an injection unit included in the chamber to supply liquid nitrogen to the chamber to freeze the secondary battery to a frozen state; and
    (iii) a cutter for cutting the secondary battery in the frozen state, wherein the cutter is included in the chamber and the cutter is configured to be movable up and down while being spaced apart from the injection unit,
    wherein the system is configured to calculate a total amount of an electrolyte solution extracted from the frozen cut secondary battery with respect to a total size of the secondary battery from a content of the extracted electrolyte solution, and then to determine a ratio of the total amount of the electrolyte solution to a content of the electrolyte solution used in manufacturing the secondary battery to obtain extraction efficiency.

12. The system according to claim 11, further comprising a remote control unit for adjusting the position and angle of the cutter with respect to a surface of the frozen battery.

* * * * *